Nov. 1, 1927. 1,647,319
H. SHULTS ET AL
WINDSHIELD WIPER
Filed May 18, 1927
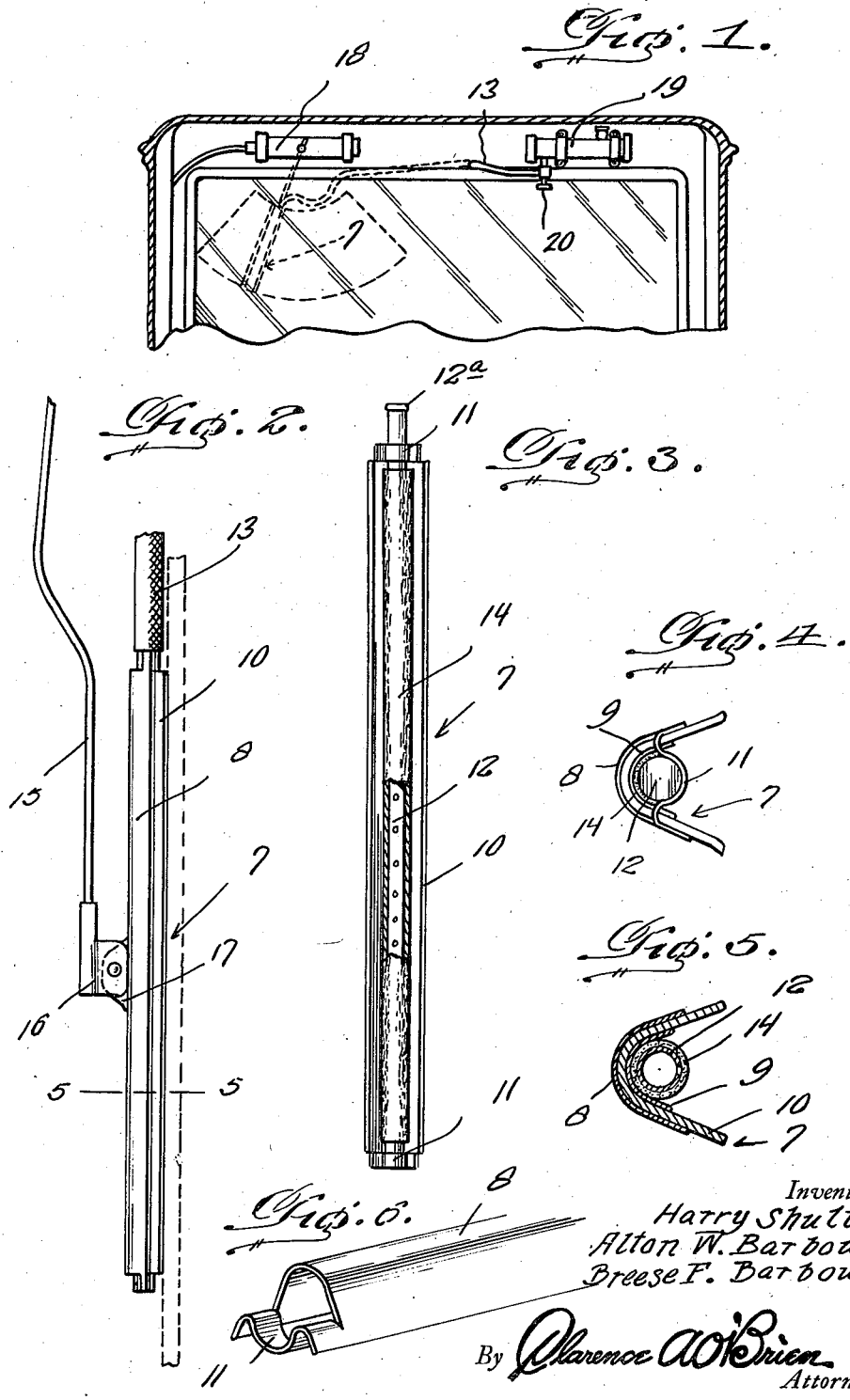
Inventors
Harry Shults,
Alton W. Barbour,
Breese F. Barbour,
By Clarence A. O'Brien
Attorney Patented Nov. 1, 1927.

1,647,319

UNITED STATES PATENT OFFICE.

HARRY SHULTS, OF GLOVERSVILLE, AND ALTON W. BARBOUR AND BREESE F. BARBOUR, OF JOHNSTOWN, NEW YORK.

WINDSHIELD WIPER.

Application filed May 18, 1927. Serial No. 192,301.

The present invention relates to an improved windshield wiper of the swinging or oscillatory type which operates through a limited arc on the outer surface of the glass and which is operated from suitable mechanical means controlled by appropriate power means.

One improvement is in the particular construction of the wiper element, which is of composite construction, the same embodying a novel double shell container for a double edge rubber squeegee, and also including an apertured fluid conducting tube, surrounded in some instances, by a cloth sleeve.

Another feature of the invention is a fluid container which is mounted on the windshield to lead by gravity, a lubricating fluid to the improved wiper, in order that this fluid may be deposited on the surface of the windshield glass in order to aid in the prevention of the collection of moisture, snow and ice on the glass.

Other features and advantages of the invention will become more readily apparent from the following description and drawings.

In the drawings:

Figure 1 is a view showing a portion of the windshield with the improved structure mounted thereon.

Figure 2 is an enlarged side view of the wiper and supporting arm.

Figure 3 is an inside elevation of the wiper element, with portions broken away and shown in section.

Figure 4 is an end elevational view.

Figure 5 is a cross section taken approximately upon the plane of the line 5—5 of Figure 2.

Figure 6 is a fragmentary perspective view of one end portion of the outer metal shell.

In the drawings, the reference character 7 designates generally the improved wiper which is composed of an outer metal shell 8, an inner metal shell 9, and an intervening rubber sheet 10 forming the customary squeegee. The shell 8 is of channel shape in cross section as is the shell 9, the latter being somewhat smaller. The edges of the rubber sheet extend beyond the edges of the shell, and form a double wiper, which is active in both directions.

Attention is directed to an apertured fluid conducting and spraying pipe 11, located in the channel of the shell 9 having its end portions confined between the especially bent retaining bands 11, at the ends of the shell 8. At one end the pipe is provided with a bead 12 with which a fluid conducting hose 13 is connected. Incidentally it will be noted that by forming the bands 11 at the opposite ends of the outer shell 8, the pipe is given the additional function of holding the parts of the wiper together, or in assembled relation. The pipe is preferably surrounded by a snug fitting sleeve 14, composed preferably of felt.

In practice the supporting and operating arm 15 is provided and is connected by way of the head 16 to an outstanding flange 17, on the shell 8. The arm 15 is connected with an operating cylinder 18, controlled from any suitable source of power. Some of these are operated by exhaust from the motor and others from individual electric motors, etc.

As far as the present invention is concerned, it is immaterial how the wiper 7 is operated, as long as it is permitted to swing back and forth in the approximate arc indicated in the drawing in Figure 1.

It is our idea to supply a special fluid to the surface of the glass to aid in preventing the accumulation of moisture, snow and ice thereon. Various kinds of fluid are on the market, at this time, for this purpose, and we therefore provide a cylinder 19 adapted to receive a limited quantity of the fluid. The cylinder is provided with a valved discharge 20 with which the aforesaid hose 13 is connected. When the valve is opened, the fluid gravitates from the cylinder 19 down into the apertured pipe 11, where it is taken up by the absorbent sleeve. When the sleeve becomes saturated, some of the fluid becomes spread over the surface traversed by the wiper, thus making the device particularly advantageous in rainy weather.

It is thought that by considering the description in connection with the drawing, a clear understanding of the invention will be had, Minor changes coming within the field of invention claimed may be resorted to, if desired.

We claim:

1. As a new product of manufacture, a wind shield wiper comprising inner and outer channel-shaped metal shells, a rubber sheet interposed between said shells and having its opposite longitudinal edges extending beyond the corresponding edges of said shells to provide a double-acting squeegee, and an apertured fluid conducting tube seated in said inner shell.

2. As a new product of manufacture, an outer channel shaped shell provided at its opposite ends with substantially semi-circular bands, a rubber sheet seated in said outer shell with its edges extending beyond the longitudinal edges of said shell, an inner channel-shaped shell fitted within the first-named shell and in contact with said rubber sheet, an apertured pipe having its ends extending through said bands for holding said shells and rubber sheet in assembled relation.

3. As a new product of manufacture, an outer channel shaped shell provided with reversely bent bands at its opposite ends, a rubber sheet fitted into said shell with its edges extending beyond the longitudinal edges of the shell, an inner channel shaped shell in contact with said rubber sheet, an apertured pipe having its ends extending through said bands for holding said shells and rubber sheets in assembled relation, said pipe having a hose retaining bead at one end and an absorbent sleeve surrounding said pipe.

In testimony whereof we affix our signatures.

HARRY SHULTS.
ALTON W. BARBOUR.
BREESE F. BARBOUR.